July 6, 1965  H. C. VICTORIAN ETAL  3,193,221
AIRCRAFT LANDING GEAR STRUT STRUCTURE
Filed Nov. 13, 1962  3 Sheets-Sheet 1
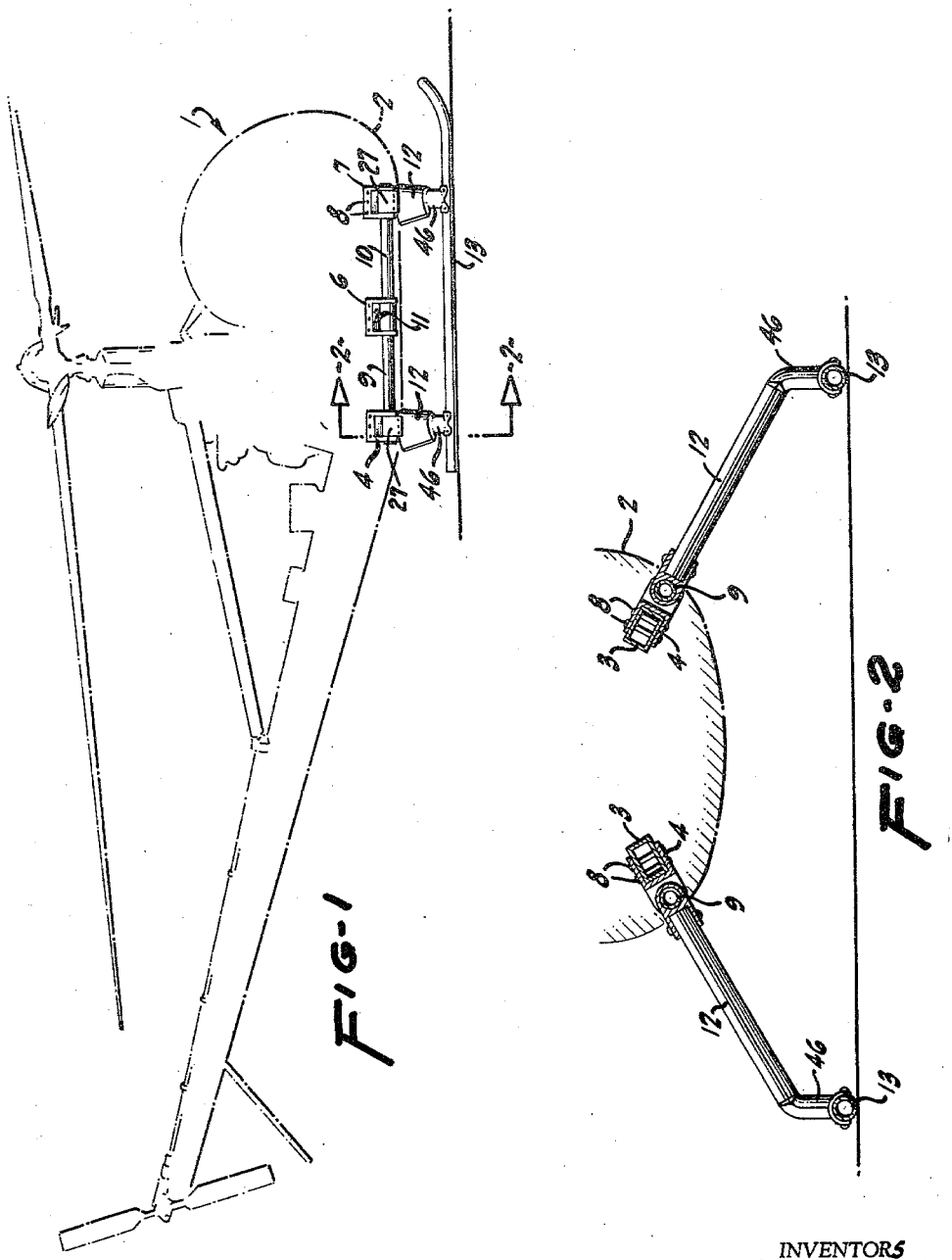
INVENTORS
HENRY C. VICTORIAN
HOWARD B. PARSHLEY
BY
ATTORNEYS

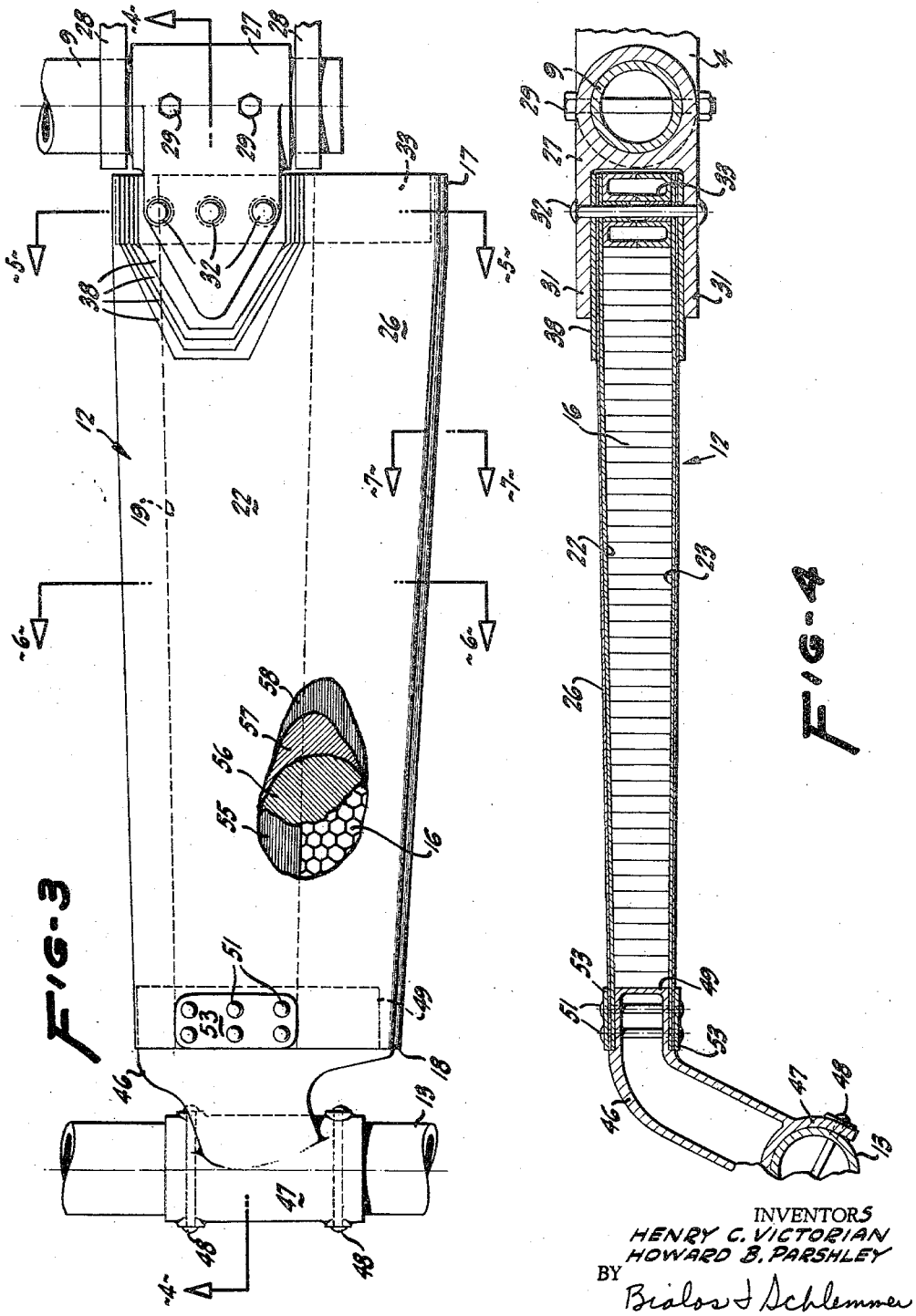

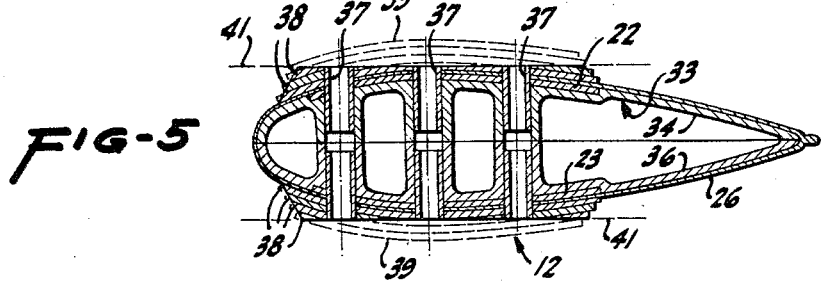
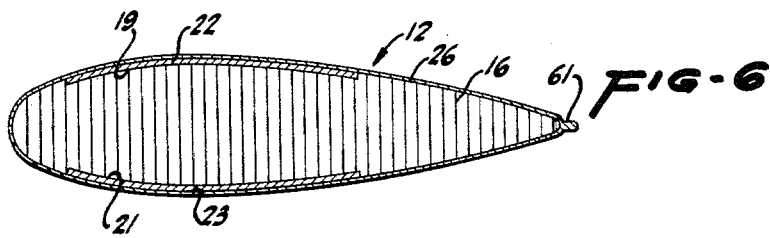
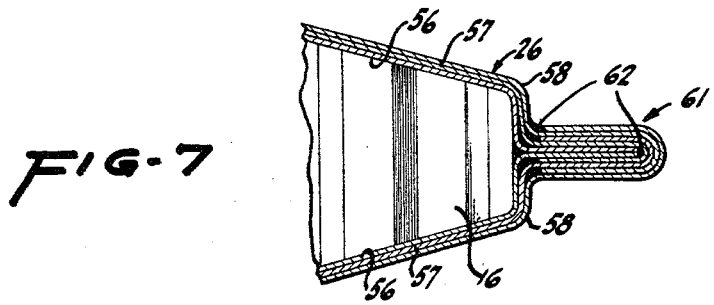
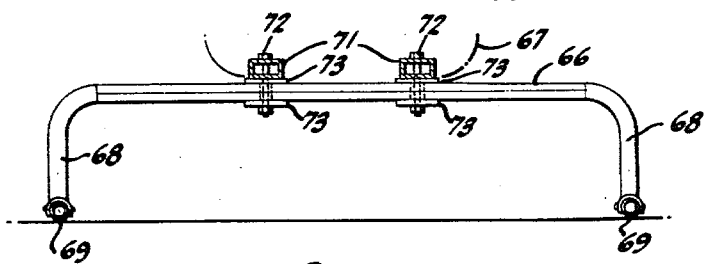
INVENTORS
HENRY C. VICTORIAN
HOWARD B. PARSHLEY
BY
Bialos & Schlemmer
ATTORNEYS 3,193,221
AIRCRAFT LANDING GEAR STRUT STRUCTURE
Henry C. Victorian, Menlo Park, and Howard B. Parshley, San Jose, Calif., assignors, by mesne assignments, to Hiller Aircraft Company, Inc., Menlo Park, Calif., a corporation of Delaware
Filed Nov. 13, 1962, Ser. No. 237,003
12 Claims. (Cl. 244—100)

This invention relates generally to aircraft landing gear. More particularly this invention relates to a light weight yet strong aircraft landing gear which includes a contoured landing gear strut structure which is highly resistant to bending, torsion and shear forces to which an aircraft landing gear is subjected. Still more particularly, this invention relates to the strut structure which forms part of a landing gear for an aircraft capable of taking off and landing vertically, such as a helicopter, and which is capable of withstanding the substantial shock loading forces to which such a landing gear is subjected during vertical landing of an aircraft.

Additionally, this invention relates to a landing gear structure which includes a light weight strut section, specifically designed to minimize drag on the aircraft during flight, which is provided with a generally airfoil shaped contour of aerodynamic design to enhance lift of the aircraft during forward flight. Such a low drag, lift enhancing strut structure is particularly important when the invention is employed in conjunction with a helicopter type aircraft with which light weight and drag minimization are very important.

The strut structure of this invention is well adapted for use in conjunction and combination with the components of known helicopter landing gear. That is, as disclosed hereinafter, the subject strut structure may be employed in conjunction with primary components of a landing gear which includes torsion bar means designed for torsional deformation during landing. Alternatively, the strut structure of this invention may be employed as or in conjunction with primary components of a landing gear which is designed for bending deformation during landing. Additionally, the subject strut structure may be employed with other types of landing gear arrangements which may suggest themselves to one skilled in the art who has reviewed this disclosure.

In summary, the strut structure of the landing gear of this invention is of composite construction and is defined by an inner light weight contoured body portion core which is surrounded by a generally smooth skin bonded to the core. In a preferred embodiment of this invention, elongated reinforcing panels are interposed between the body portion of the strut and the skin surrounding the same. Preferably such reinforcing panels are arranged to extend along opposite upper and lower surfaces of the body portion.

The body portion is preformed from a core of sturdy yet light weight material capable of withstanding the substantial shear forces to which a helicopter landing gear is subjected during landing. In this regard, so-called honeycomb material has been found highly effective for use with the body portion. Preferably the body portion is aerodynamically contoured with an airfoil shape to reduce drag during flight.

To enhance further the capability of the strut and its body portion to resist the bending moments to which a helicopter landing gear is subjected, strut reinforcing panels of light weight material are provided along opposite upper and lower surfaces of the body portion, preferably for its full length.

The resistance of the strut structure to torsional moments imparted thereto during landing is enhanced by a light weight reinforcing skin surrounding the body portion and its associated longitudinally arranged reinforcing panels. Preferably, as pointed out in detail hereinafter, the skin is generally smooth, follows closely the airfoil contour of the body portion core, and is formed from a material which imparts isotropic characteristics to the skin.

In this way, an extremely sturdy strut structure is produced which is capable of resisting high bending, torsion and shear forces without adversely increasing the weight of the landing gear or its drag coefficients.

From the foregoing, it should be understood that this invention relates to the provision of a light weight, low drag aircraft landing gear structure; the provision of strut structure to be used in conjunction with aircraft landing gear structure of various types; the provision of a sturdy yet light weight strut structure for a helicopter landing gear; and the provision of a composite strut structure to be interposed operatively between an aircraft chassis and that portion of the landing gear of an aircraft designed to engage a landing surface.

These and other objects will become evident from a study of the following disclosure in which reference is directed to the accompanying drawings.

FIG. 1 is a side elevational view of one embodiment of the subject landing gear structure shown operatively positioned on a helicopter illustrated in phantom lines.

FIG. 2 is a vertical sectional view through the landing gear structure taken in the plane of line 2—2 of FIG. 1.

FIG. 3 is a plan view, partially cut away, of a preferred embodiment of the strut structure of the landing gear.

FIG. 4 is a longitudinal vertical sectional view of the strut structure taken in the plane of line 4—4 of FIG. 3.

FIGS. 5 and 6 are vertical transverse sectional views of the strut structure taken in the planes of lines 5—5 and 6—6, respectively, of FIG. 3.

FIG. 7 is a partial transverse vertical sectional view of a trailing edge portion of the strut structure, on an enlarged scale relative to its reference figure, taken in the plane of line 7—7 of FIG. 3.

FIG. 8 is a view corresponding generally to FIG. 2 showing a modified installation for the subject strut structure.

In the designing of vertical take-off and landing aircraft, particularly helicopters, substantial consideration must be given to the overall weight of the aircraft. In line with such consideration, it has been found highly desirable to minimize wherever possible the weight of the respective components of the landing gear.

However, weight reduction is not feasible unless the resulting landing gear structure is capable of withstanding the high stresses to which a helicopter is subjected during landing on a landing surface, such as land or a body of water. During landing, the landing gear is shock loaded and the strut structure which supports and interconnects the landing surface engaging means of the landing gear with the aircraft chassis must be capable of sustaining substantial shock loads, including shear, bending and torsional stresses.

Heretofore, helicopters have utilized solid or tubular steel struts interposed between the chassis and the skid runner or other means for engaging the landing surface. However, in comparison to the subject invention, such steel struts are heavy and produce substantial drag because they lack the aerodynamic contour provided by the strut structure of this invention.

As shown in the drawings, the strut structure of this invention comprises a fabricated or composite strut section. In the embodiment of the invention shown in FIGS. 1–7, the strut structure is illustrated in conjunction with a torsion bar landing gear. A modified arrangement however, is shown in FIG. 8 in which landing shock is absorbed by bending rather than torsional twisting.

Reference is first directed to FIGS. 1 and 2 in which the landing gear embodying this invention is attached to the chassis of a helicopter 1 shown in phantom lines. The helicopter chassis 2 includes a framework comprising longitudinal structural members 3, preferably of hollow tubular construction, extending along opposite sides thereof, to which the landing gear structure is operatively connected. If torsion type landing gear structure is employed, means in the form of a series of mounting brackets 4, 6 and 7 are spacedly secured by rivets or bolts 8 to the chassis structural members. The landing gear includes two opposed structural portions extending from opposite sides of the chassis as seen in FIG. 2.

While reference is hereinafter directed to that portion of the landing gear structure which projects generally laterally and downwardly from only one side of the helicopter chassis, and more particularly to the strut structure employed on such one side, it should be understood that those portions of the landing gear structure on opposite sides of the chassis are substantially identical.

Bracket 6 is interposed between brackets 4 and 7 and a pair of torsion bar sections 9 and 10 extend in opposite directions from the intermediate bracket 6. These torsion bar sections are secured against turning at their inner ends received in bracket 6 by any suitable means, such as by a pin 11 extending through aligned apertures in bracket 6 and the inner ends of the torsion bar sections 9 and 10. As is known, the bar sections may be formed in one piece or two separate pieces operatively interconnected by bracket 6 and pin 11, and may be solid or hollow as required.

The outer ends of bar sections 9 and 10 are journaled in the spaced brackets 4 and 7 and are free to twist in such brackets. It is to these outer freely twistable opposite ends of bar sections 9 and 10 that the strut structures 12 of the subject invention are operatively connected. To this end, means to be described hereinafter are secured to the opposite outer ends of the bar sections and it is to such connecting means that the strut sections 12 of this invention are connected.

Referring now to FIG. 1, it will be noted that two strut structures are provided along each side of the aircraft in spaced relationship. Landing surface engaging means of any suitable type is operatively connected to the lower ends of the strut structures. In the embodiment illustrated an elongated runner member 13 is employed. Such runner member in the illustrated embodiment is of the so-called skid type defined by a hollow light weight tube of the type heretofore commonly employed with helicopter landing gear. Other types of landing surface engaging means, such as wheels or floats, also can be employed if preferred.

It should be understood from the foregoing that, upon landing of the helicopter on a landing surface, the shock of landing will be transmitted from the skid member 13 through the strut structures 12 to the torsion bar sections 9 and 10. Such torsion bar sections are twistable independently of each other and absorb the landing shock and cushion the same to preclude damage to the aircraft chassis during landing.

Reference is now directed to FIGS. 3–7 which illustrate a preferred embodiment of the strut structure of this invention. As best seen in FIG. 6, the strut is defined by an inner contoured body portion or core 16, which preferably is formed with a generally airfoil shaped aerodynamic outer surface. To minimize the weight of the strut, the body portion 16 is formed from a sturdy yet light weight material, preferably a honeycomb material (note FIGS. 3 and 7), so-called because the material in cross section has the appearance of a cellular honeycomb structure produced by bees. The honeycomb material preferably is of a light weight metal, such as aluminum, of the type commercially available from several sources. While the size of the respective cells in the honeycomb body portion 16 may vary, depending upon the size of the strut required for a given aircraft, a structure formed from aluminum having ¼ inch cells has been found highly effective. Honeycomb material of this type is obtainable from Hexcel Products Inc. of Berkeley, California.

The honeycomb body portion 16 is shown in one piece in the drawing but it should be understood that, if required for ease of manufacture, two or more body sections may be separately formed and subsequently bonded together by any suitable dry film adhesive into the desired airfoil contoured body portion.

It is the body portion of the strut that is designed to absorb the high shear stresses which are imparted to the strut structure when an aircraft is landed on a given surface. The honeycomb core of the body portion also stabilizes the remaining components of the strut and further forms a base upon which such additional components may be mounted. As best seen in FIGS. 3 and 4 the body portion tapers or decreases in transverse width and thickness gradually and progressively from its inner end 17 towards its outer end 18.

A pair of shallow grooves 19 and 21 are provided in the opposite upper and lower surfaces of the strut body portion. Such grooves extend for the full length of the strut section defined by the body portion and extend for a substantial distance transversely of the body portion and follow generally its airfoil contour as shown clearly in FIG. 6. Preferably, the depth and width of these grooves progressively decrease from the inner end 17 of the body portion toward its outer end 18.

Means are provided for reinforcing and strengthening the strut to enhance the resistance of the body portion to bending moments imparted thereto when an aircraft is landed. Such means are positioned along the upper and lower surfaces of the body portion in the aforementioned grooves.

Preferably such means comprise a pair of light weight reinforcing panels 22 and 23 received in the respective grooves 19 and 21. The panels 22 and 23 correspond substantially in thickness and width to the dimensions of the respective grooves in which they are positioned but are longer than the body portion for a purpose to be described. Thus, the reinforcing panels 22 and 23 co-operate with the body portion 16 in providing a substantially continuous airfoil shaped strut section, the exact contour of which is determined by the aerodynamic characteristics desired for a given landing gear.

Further details of the reinforcing panels 22 and 23 will be discussed hereinafter but it should be understood that the width of such panels may vary in accordance with the dimensions of a given strut structure and the degree of reinforcement desired. It has been found effective, however, that such panels and their associated grooves extend approximately between the 15% and 60% chord lines of the strut.

Additional means is provided as part of the composite strut structure to enhance its resistance to the torsional moments imparted to the strut when the aircraft is landed. Such means in the embodiment illustrated comprises a skin which surrounds and is securely united with the body portion 16 and co-operable reinforcing panels 22 and 23. Preferably the skin 26 of the strut structure is formed from material which imparts isotropic characteristics to the skin, that is, characteristics so that the skin has essentially the same properties in all directions. To this end, as will be described, the skin 26 preferably is formed from laminations of sheet material formed around the body portion and securely bonded thereto and to each other.

Before discussing further the structure of the reinforcing panels 22 and 23 and the isotropic skin 26, reference is directed to FIGS. 3–5 which illustrate the means by which the strut structure of this invention is operatively connected to the chassis of the aircraft through its associated torsion bar section 9. To this end, mounting means in the form of a metal bracket 27 is positioned to surround the torsion bar section. Such bracket is non-rotatably secured to the bar section so that such bracket will effect twisting movement of the torsion bar section about its longitudinal axis when the bracket is moved upwardly or downwardly as viewed in FIG. 4. In this regard, as seen clearly in FIG. 3, the torsion bar section 9 is journalled between the spaced apertured arms 28 which form part of the aforementioned mounting bracket 4 secured to the chassis of the aircraft.

It is between such arms 28 that the strut mounting bracket 27 is positioned. Spaced bolt and nut assemblies 29 are employed to operatively secure the bracket 27 to its associated torsion bar section but other securing means, such as welding, may be employed if preferred.

Each bracket 27 includes a forked end defined by vertically spaced arms 31, the spacing between which is determined generally by the size of the inner end 17 of the strut to be received therein. Rivet or bolt fasteners 32 are extended through spaced apertures provided in the spaced arms 31 and such fasteners extend through the arms and through the strut end to operatively secure the strut structure to the torsion bar via the bracket 27.

To insure secure engagement between the strut structure and bracket, a preformed metal insert 33, preferably formed in two substantially identical upper and lower sections 34 and 36 as seen in FIG. 5, is employed. The insert 33 is generally hollow to minimize its weight and is formed with an outer contour which corresponds to and forms an extension of the body portion 16 of the strut, as seen in FIG. 5. To this end, aforementioned reinforcing panels 22 and 23 are received in shallow grooves in the insert 33 which form extensions of the grooves 19 and 21 provided in the body portion.

The fasteners 32 which secure the strut structure to the bracket 27 pass through upright bores provided in the insert 33 in which suitable bushings 37 are positioned to preclude bearing wear between the bolts and the strut structure. It should be understood that the insert preferably is securely bonded to the inner end of the body portion by a suitable metal bonding adhesive so that, in effect, the insert forms an integral continuation of the body portion.

Preferably means is provided at the inner end of the strut structure to further reinforce the same at its location of juncture with the bracket 27. In the embodiment illustrated such reinforcing means includes a series of plies of reinforcing material 38. Such reinforcing plies preferably are initially laminated together by a bonding adhesive and are bonded to follow the contour of the inner end of the strut structure as shown in dotted lines at 39 in FIG. 5. To provide a planar surface along the upper and lower surfaces of the strut structure so that the strut may be received between the arms 31 of the bracket 27, the laminated plies are ground or machined off, as shown at 41 in FIG. 5.

Such reinforcing plies 38 may be formed from metal plates of light weight material but, preferably, such plies are formed from non-metallic material of the type to be described hereinafter which is employed for the reinforcing panels 22 and 23 and the isotropic skin 26.

At its outer end 18, the strut structure includes connecting means for securing the composite strut section just described to the runner member 13. To this end, a rigid, preferably hollow, bent metal leg 46 is provided. Tubular leg 46 includes a curved bottom shoe portion 47 dimensioned to fit around runner member 13 and is secured thereto by spaced rivet or bolt fasteners 48 which extend through aligned apertures provided in the shoe and runner as shown in FIGS. 3 and 4.

At its upper or inner end 49, leg 46 is contoured and dimensioned to fit within the skin 26 of the strut so as to form a substantial continuation of the body portion 16. The leg abuts the outer end of body portion 16 and is bonded thereto as an integral continuation thereof by any suitable adhesive. The contoured end 49 of the leg 46 is provided with continuations of the grooves 19 and 21 of the body portion and the reinforcing panels 22 and 23 overlie and contact the leg as seen in FIG. 4.

Suitable bolt or rivet fasteners 51 extent through bearing plates 53, the outer ends of the reinforcing panels and the skin of the strut, and the inner end 49 of the leg as seen in FIGS. 3 and 4 and thus securely maintain the leg member, and thereby the runner member, to the composite strut section.

From the foregoing described construction, it will be seen that the strut structure, although formed from composite parts, defines an integrated whole and includes a substantially continuous and integrated assembly which is capable of withstanding large landing shocks to which a helicopter landing gear is subjected.

With further regard to the leg 46, it should be noted that this leg is provided with a smooth tapered outer contour of substantial aerodynamic airfoil shape to further minimize drag and weight. The leg may be cast in one piece from any suitable high strength metal, such as an alloy of aluminum.

With a strut construction as thus described, it has been found that drag is appreciably reduced and also that the clean aerodynamic design and airfoil contour of the strut actually produce lifting effects which help sustain the helicopter when the helicopter is moving in forward flight.

The weight of the strut of this invention has been minimized by the choice of material preferably employed for the reinforcing panels 22 and 23 and the isotropic skin 26. To this end, sheets or panels of structural material comprised principal of elongated reinforcing fibers bonded together into a strong construction by a suitable epoxy or like resin have been found highly effective. In this connection, one preferred material for use in this regard is formed from elongated glass fibers bonded together by a suitable resin as noted. Such a product is commercially available in sheets or panels of desired sizes and may be obtained, by way of example, from the Minnesota Mining and Manufacturing Co. as its trademarked product Scotchply.

With respect to the reinforcing panels 22 and 23, the reinforcing fibers thereof are arranged to extend in generally the same direction and generally parallel to each other so that such fibers are uni-directionally oriented. The panels are positioned to extend generally longitudinally of the structure, so that their fibers also extend generally longitudinally as shown at 55 in FIG. 3. Thus, the bonded fibers of the panels are oriented to most effectively resist the bending moments imparted to the strut during landing of the aircraft.

The isotropic skin 26 of the strut similarly is formed preferably from uni-directionally oriented fiber reinforcing material. However, to obtain isotropic properties in the skin with uni-directionally oriented fiber material it is necessary to bond several layers of such material one on the other so that the skin may effectively resist the torsional moments imparted to the strut during aircraft landing. To this end, as best seen in FIG. 3, the isotropic skin 26 is formed from a plurality of layers of reinforcing fiber material bonded to each other with a suitable resin, such as the epoxy resin employed for bonding the individual fibers to each other.

In the preferred embodiment illustrated in the drawings, the skin 26 is defined by three discrete layers 56, 57 and 58 of uni-directionally oriented reinforcing fibers. In this regard, the desired isotropic characteristics are obtained by arranging the respective layers so that the fibers in the layers are angularly oriented relative to each other. By way of specific example as seen in FIG. 3, one layer 58 is positioned with its fibers extending generally longitudinally of the strut, while the other layers 56 and 57 are arranged with their fibers extending generally at a 45° angle relative to the fibers of the layer 58, and at a 90° angle relative to the fibers of each other.

In this manner a laminated isotropic skin is formed which has substantially the same properties in all directions and thus is highly resistant to torsional moments imparted to the strut during landing.

While three laminated layers have been found adequate to define the necessary isotropic skin, more than three layers may be utilized if required for a given installation.

Preferably the aforementioned reinforcing plies 38 interposed between the inner end of the strut and the bracket 27 also are formed from uni-directional fiber material of the type described. In such case the plies may be positioned with their fibers extending generally longitudinally of the strut or alternate plies may have their fibers angularly arranged relative to the remaining plies.

Desirably the respective layers which together define the isotropic skin surrounding the body portion of the strut are formed around the body portion by known procedures and are bonded together and cured in place around the body portion. To this end, because discrete layers 56, 57 and 58 initially are employed to build up the isotropic skin and are subsequently bonded to each other, the trailing edge 61 of each strut is defined by the overlapped and interfitted edge portions of the respective skin layers as seen in FIG. 7. Preferably, to insure a securely joined and continuously contoured trailing edge, the voids in the trailing edge at the ends of the respective skin layers are filled with the adhesive employed in the bonding operation, as shown at 62 in FIG. 7.

While the embodiment thus far described has referred to use of the strut structure of this invention in conjunction with a torsion bar type landing gear structure, as shown in FIG. 8 the strut structure is also well suited for use in conjunction with a bendable type landing gear structure. To this end, an elongated composite strut 66 having the characteristics and construction described previously, but which is of substantially longer length, is secured beneath the chassis 67 of the helicopter. Thus the strut 66 projects the full distance beneath and laterally beyond opposite sides of the chassis. Rigid tubular leg members 68 of the general type described previously at 46, but of slightly different contour, are secured to opposite ends of the strut and depend therefrom. These leg members in turn are connected to runner members 69 in the manner described previously.

The bendable strut 66 is operatively connected to spaced structural members 71 which form part of the chassis framework of the aircraft. Conventional bolt and nut assemblies 72 extend through the structural members 71 and the strut through suitable aligned apertures provided in the strut and the structural members. Bearing plates 73 are interposed between the strut and the structural members 71 and the fastening nuts to preclude damage to the strut. Also, suitable bushings preferably are positioned in the apertures projecting through the strut to similarly protect the same from damage. In this manner, the strut 66 is positioned primarily to absorb by bending the shock of aircraft landing.

It should be understood that, in the embodiment shown in FIG. 8, a pair of such struts are positioned fore and aft of the aircraft with the runner member 69 extending between the leg members secured to the struts along opposite sides of the aircraft.

Obviously the strut structure of this invention may take various dimensions and airfoil contours, depending upon the size and weight of the aircraft to which it is attached, and further depending upon the style of landing gear with which it is used. However, by way of giving one specific example, an airfoil found suitable for use with a helicopter employing torsion bar type landing gear may take the contour, configuration and dimensions established by National Aeronautics and Space Administration airfoil section 0025.

Having thus made a full disclosure of this invention, attention is directed to the appended claims. It should be understood, however, that modifications to this invention which may become apparent to one skilled in the art after reference has been taken to this disclosure are contemplated within the scope of this invention as defined by the appended claims.

We claim:

1. An aircraft landing gear including strut structure operatively positioned between the chassis of an aircraft and means for engaging a landing surface, said strut structure comprising a lightweight contoured strut section; said strut section comprising an inner preformed body portion of honeycomb material which has a generally aerodynamic contour to minimize drag during flight, opposite elongated panels comprised of uni-directional reinforcing fibers underlying and overlying said body portion, the fibers of said panels being oriented to extend longitudinally of said section, and an isotropic skin surrounding said body portion and said panels and bonded therearound; and means for securing said strut structure to said aircraft chassis and to said landing surface engaging means.

2. An aircraft landing gear including strut structure operatively positioned between the chassis of an aircraft and means for engaging a landing surface, said strut structure comprising a lightweight generally airfoil contoured strut section; said strut section comprising an inner body portion of honeycomb metal having generally an airfoil outer contour, opposite elongated panels comprised of uni-directional reinforcing fibers extending along opposite surfaces of said body portion and secured thereto, the fibers of said panels being elongated and oriented to extend longitudinally of said strut section, and an isotropic skin surrounding said body and said uni-directional panels, said skin comprising discrete layers of uni-directional reinforcing fibers bonded to each other, the fibers in the respective layers being angularly oriented relative to the fibers in the other layers to impart isotropic characteristics to said skin; and means for securing said strut structure to said aircraft chassis and to said landing surface engaging means.

3. In combination with an aircraft having structural members forming part of the chassis thereof, landing gear structure projecting generally laterally from said chassis for supporting said aircraft on a landing surface, means operatively connecting said landing gear structure to said structural members of said chassis, means for engaging a landing surface when said aircraft is supported thereon by said landing gear structure, and strut structure interposed between and connected with said first and second mentioned means and operatively interconnecting the same; said strut structure comprising an elongated generally airfoil contoured body portion of lightweight material, a pair of elongated reinforcing panels extending longitudinally of said body portion along opposite surfaces thereof, and a reinforcing skin surrounding said body portion and said panels and bonded therearound, said skin conforming closely to the contour of said body portion and having isotropic characteristics for resisting bending, torsion and shear forces to which said strut structure is subjected during aircraft landing.

4. The combination of claim 3 in which said means operatively connecting said landing gear structure to said chassis structural members includes a twistable torsion bar for torsionally absorbing landing shocks when said aircraft is landed on said landing surface.

5. The combination of claim 3 in which said strut structure extends transversely of said chassis on opposite sides thereof to absorb landing shocks by bending deflection when said aircraft is landed on said landing surface.

6. In combination with an aircraft having structural members forming part of the chassis thereof, landing gear structure projecting generally laterally from said chassis for supporting said aircraft on a landing surface, means operatively connecting said landing gear structure to said structural members of said chassis, means for engaging a landing surface when said aircraft is supported thereon by said landing gear structure, and strut structure interposed between and connected with said first and second mentioned means and operatively interconnecting the same; said strut structure comprising an elongated generally airfoil contoured body portion of lightweight honeycomb material, a pair of elongated reinforcing panels extending longitudinally of said body portion along opposite surfaces thereof, said panels each being formed of elongated reinforcing fibers in which the fibers are uni-directionally oriented to extend generally longitudinally of said body portion, and a skin formed of elongated reinforcing fibers surrounding said body portion and said panels and bonded therearound; said skin comprising a plurality of at least three discrete layers of reinforcing fibers securely bonded together, the fibers in each of said layers being generally uni-directionally oriented with the fibers in each layer being angularly oriented relative to the fibers of each of the other layers.

7. Aircraft landing gear structure for supporting an aircraft on a landing surface including means for operatively connecting said landing gear structure with the chassis of an aircraft, means for engaging a landing surface when such aircraft is supported thereon by said landing gear structure, and strut structure which is resistant to bending, torsion and shear forces interposed between and connected with said first and second mentioned means and operatively interconnecting the same; said strut structure comprising an elongated generally airfoil contoured body portion of lightweight honeycomb metal for enhancing shear resistance of said strut structure, a pair of elongated panels extending longitudinally of said body portion along opposite surfaces thereof, said panels each being formed of reinforcing fibers in which the fibers are uni-directionally oriented and extend generally longitudinally of said body portion for enhancing bending resistance of said strut structure, and an isotropic skin of reinforcing fibers surrounding said body portion and said panels and bonded therearound for enhancing torsional resistance of said structure; said skin comprising three discrete layers of reinforcing fibers bonded together, the fibers in each of said layers being generally uni-directionally oriented, with the fibers in each layer being angularly related relative to the fibers of each of the other layers to impart isotropic characteristics to said skin.

8. In combination with a helicopter having structural members forming part of the chassis thereof, landing gear structure projecting generally laterally from said chassis for supporting said aircraft on a landing surface, means including a bracket operatively connecting said landing gear structure to said structural members of said chassis, means for engaging a landing surface when said aircraft is supported thereon by said landing gear structure, and strut structure interposed between and connected with said bracket and said landing surface engaging means; said strut structure comprising an elongated generally airfoil contoured body portion of lightweight material, a pair of elongated fiber reinforcing panels extending longitudinally of said body portion along opposite surfaces thereof, and an isotropic fiber skin surrounding said body portion and said panels and bonded therearound; and plies of reinforcing material interposed between said strut structure and said bracket.

9. The combination of claim 8 in which said landing gear structure includes a rigid metal leg interposed between an outer end of said strut body portion and said landing surface engaging means.

10. The combination of claim 8 in which said landing surface engaging means comprises an elongated runner member.

11. In combination with a helicopter having a chassis, a landing gear structure projecting laterally from each side of said chassis including a strut, bracket means connecting one end of said strut to said chassis, and bracket means connecting the opposite end of said strut to a ground engageable landing member; each strut comprising a body portion of honeycomb material, an elongated fabric panel of uni-directional reinforcing fibers extending longitudinally of and adhesively bonded to each of the upper and lower surfaces of such strut with the fibers orientated to extend longitudinally of said body portion to resist bending moments imparted to said body portions during landing, and a fabric skin surrounding said body portion and said panels and adhesively bonded therearound.

12. Strut structure for an aircraft landing gear comprising an inner body portion formed of lightweight metal honeycomb material having a generally airfoil shaped contour, elongated panels comprised of uni-directional reinforcing fibers extending longitudinally along opposite upper and lower surfaces of said body portion, the fibers of said panels being oriented to extend longitudinally of said structure to resist bending moments imparted to said body portion during landing, and an isotropic skin surrounding said body portion and said panels and bonded therearound, said isotropic skin comprising three discrete layers of reinforcing fibers securely bonded to each other, the fibers of each of said layers being uni-directionally oriented, with the fibers of each such layer being angularly oriented relative to the fibers of each of the other layers.

References Cited by the Examiner

UNITED STATES PATENTS

| | | | |
|---|---|---|---|
| 1,508,366 | 9/24 | Klemm | 244—104 |
| 3,001,362 | 9/61 | Runton | 244—133 X |
| 3,020,986 | 2/62 | Kirk et al. | 244—123 X |
| 3,028,292 | 4/62 | Hinds | 244—123 X |
| 3,096,053 | 7/63 | Pajak | 244—133 |

FOREIGN PATENTS 438,165   11/35   Great Britain.

OTHER REFERENCES

Aviation Week and Space Technology, August 7, 1961, page 99.

MILTON BUCHLER, *Primary Examiner.*

FERGUS S. MIDDLETON, ANDREW H. FARRELL,
*Examiners.*